OPTOELECTRONIC LOGIC ELEMENT COMPRISING A VACUUM-FLUORESCENT LIGHT SOURCE

Filed Aug. 13, 1965

INVENTORS
RICHARD DUBOIS, JR.
HAROLD D. JOHNSON
BY HERBERT E. PESSIN
Eyre, Mann, & Lucas
ATTORNEYS INVENTORS
RICHARD DUBOIS, JR.
HAROLD D. JOHNSON
BY HERBERT E. PESSIN
Eyre, Mann & Lucas
ATTORNEYS United States Patent Office 3,406,288
Patented Oct. 15, 1968

3,406,288
OPTOELECTRONIC LOGIC ELEMENT COMPRISING A VACUUM-FLUORESCENT LIGHT SOURCE

Richard Du Bois, Jr., Caldwell Township, Harold D. Johnson, Parsippany, and Herbert E. Pessin, West Caldwell, N.J., assignors, by mesne assignments, to Wagner Electric Corporation, South Bend, Ind., a corporation of Delaware Filed Aug. 13, 1965, Ser. No. 479,425
18 Claims. (Cl. 250—217)

This invention relates to a readout device for generating light patterns which form selective numbers or letters. The invention has particular reference to a readout device which includes an evacuated envelope containing components which produce the desired indicia by electron bombardment of a fluorescent material on an anode.

Many readout devices have been developed and manufactured. Many of these devices are mechanically operated and for this reason do not possess the speed required by some computer circuits. Other devices, containing a rarefied gas within a sealed envelope, show letters or numbers that are not in the same plane and are therefore difficult to read. The gas-filled readout devices also take some time to be activated and require the making and breaking of a considerable current when transferring from one character to another. The present invention is a vacuum device, shows all the indicia on a single plane, and since it is an electron controlled device, it can be operated at very high speeds. Also, since the device is grid controlled, the transfer from one figure to another requires only the switching of a voltage in a high impedance circuit.

This readout device, with a minor change, can be used as an "AND" computer component. In this application, there is no electrical connection between the input circuit and the output circuit.

One of the objects of this invention is to provide an improved readout device which avoids one or more of the disadvantages and limitations of prior art arrangements.

Another object of the invention is to increase the speed of response of readout devices.

Another object of the invention is to provide a readout device which can be switched from one character to another with a minimum of actuating power.

Another object of the invention is to show readout characters in a single flat common plane.

Another object of the invention is to produce an "AND" computer component having no electrical connection between the "AND" input tube and an output photoelectric or photoconductive cell.

The invention comprises a vacuum fluorescent readout device comprising a sealed envelope including a cathode, an anode, and a plurality of control electrodes. The envelope also contains a flat insulator member positioned between the cathode and the anode. The insulator is formed with a plurality of apertures for the passage of electrons which move from the cathode to the anode. These apertures are arranged in a desired pattern for the selective formation of the indicia on the anode. A fluorescent material is deposited on the anode for the generation of light when activated by an electron stream. The control electrodes are respectively positioned adjacent to the apertures in the insulator for selectively controlling the passage of electrons therethrough and for applying electrons to the adjacent anode area.

One feature of the invention includes an anode comprising a flat conductor formed with a plurality of spaced openings for the passage of electrons. Another feature of the invention includes a transparent plate, generally made of glass, mounted in close proximity to the anode for restricting the movement of electrons.

For a better understanding of the present invention, together with other and further objects thereof, reference is made to the following description taken in connection with the accompanying drawings.

Figure 1:
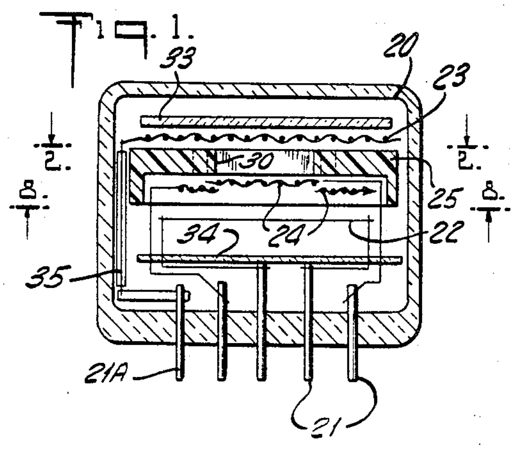
FIG. 1 is a cross sectional view of the readout device taken along an axial plane and showing the components.
Figure 2:
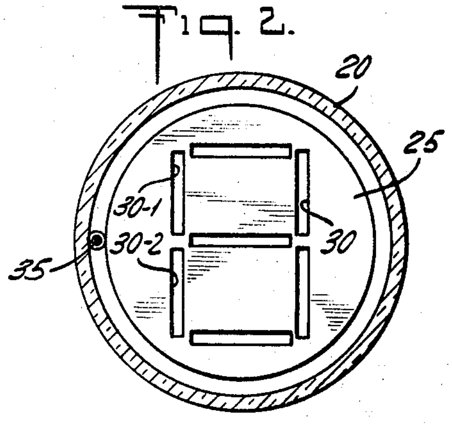
FIG. 2 is a cross sectional view of the device shown in FIG. 1 and is taken along line 2—2 of that figure. This view shows the position of the apertures in the insulator.
Figure 3:
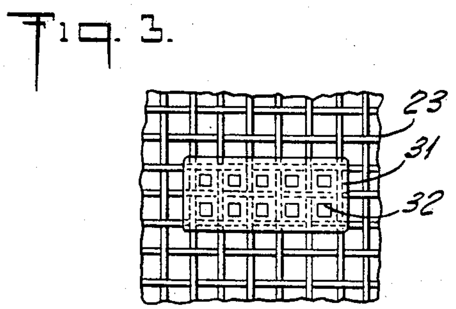
FIG. 3 is an enlarged plan view of a portion of the anode showing a small area of fluorescent material deposited on a wire mesh anode.
Figure 4:
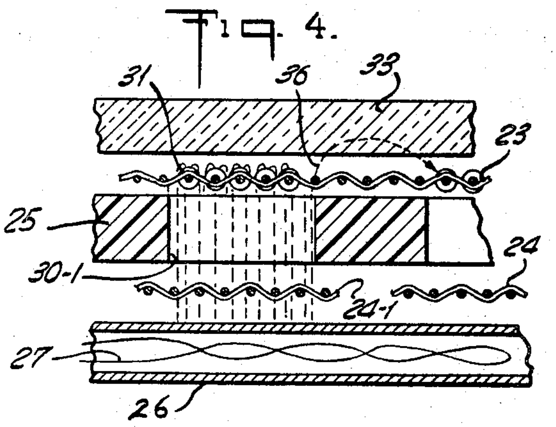
FIG. 4 is a cross sectional view, to an enlarged scale, of a portion of the readout device and shows the details of the anode, the glass plate, the insulator, and two of the control electrodes. In this view the cathode is indirectly heated.
Figure 8:
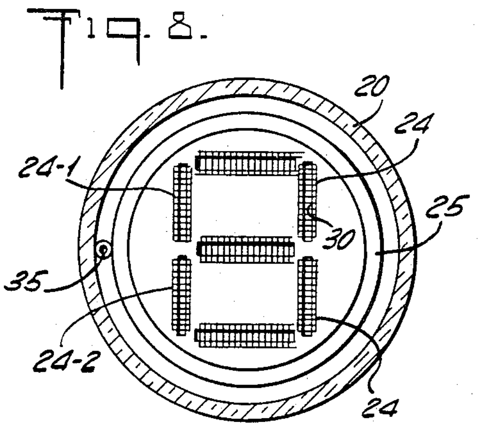
FIG. 8 is a cross sectional view of the readout device shown in FIG. 1 and is taken along line 8—8 of that figure. This view shows the positions of the control grids.

Referring now to FIGS. 1, 2, 3, 4 and 8, the readout device comprises an envelope 20 having a plurality of lead-in conductive pins 21 sealed in a base portion of the envelope. Within the envelope is a cathode 22, an anode 23, a plurality of control electrodes 24 and an insulator disk 25. The cathode 22 may be one or more wires, such as tungsten, which are heated by the passage of current and which emit electrons. The cathode may also comprise a metal sleeve 26 (FIG. 4) covered with emissive material and heated by an internal resistance wire 27. The anode 23 is preferably made of wire mesh as shown in FIGS. 1, 3 and 4. However, it may be made of a solid transparent conductive film. The control electrodes 24 may comprise areas of woven mesh material, or they may be made of wires mounted on two rods as indicated in FIG. 8. The insulator 25 may be made of glass, ceramic, or mica. This insulator is formed with apertures 30, one pattern being shown in FIG. 2. As shown in FIG. 8, the grids 24 are mounted under the apertures 30, being generally a little greater in extent than the dimensions of the apertures.

The prefered form of the anode 23 has fluorescent material 31 deposited on certain areas. These areas are designed to correspond with the apertures 30 in the insulator plate. In the preferred design, the fluorescent material is sprayed onto the mesh 23 and adheres only to the mesh material, leaving small holes 32 in the material so that electrons may pass through. The fluorescent material may be deposited over the entire anode surface since the apertures shield those portions which are not to fluoresce. However, the preferred design produces sharper characters.

A glass plate 33 is mounted just above the anode 23 and is parallel to it. This plate may be of any transparent insulator material and mica or a quartz plate may be used. A similar insulator plate 34 may be positioned above the pins 21 to shield them from electrode sputtering and to form a barrier for a getter capsule which may be mounted underneath it. This insulator plate 34 is not always necessary. The anode lead which is connected to pin 21A may be encased in a glass tube 35 for purposes of insulation and to eliminate direct transfer of electrons from cathode 22.

The operation of this device is as follows: when no indicia are to be shown, all seven control electrodes 24 are maintained at a negative cut-off potential so that no electrons can move through the control electrodes to the anode. While in this condition, there is no light generated by any portion of the anode. Now, let it be assumed that the control electrodes 24–1 and 24–2 are supplied with a potential more positive than the cut-off value. This condition sends a stream of electrons through apertures 30–1 and 30–2 and two of the segments of fluorescent material 31 light up to produce a "1" on the anode 23 to show the desired digit.

Referring now to FIGS. 3 and 4, let it be assumed that the control electrode 24–1 is one of the two that has been given a changed potential. This potential sends an electron stream through aperture 30–1 in insulator 25 and the electrons strike some of the fluorescent material 31 on the anode mesh 23. Those electrons which strike the fluorescent material directly behind one of the anode wires produce little light visible through the end of the envelope. However, those electrons which pass through the openings 32 in the fluorescent material are bent around by the anode potential and strike the fluorescent material on the side adjacent to the glass plate 33 and thereby produce considerable illumination. There are always some electrons, having high velocities, which move through the anode mesh and tend to spread out over the adjoining areas. One of these electron paths 36 is shown in FIG 4, this path being possible only if the plate 33 is not in the position shown. With glass plate 33 placed close to the anode mesh 23, high speed electrons are prevented from moving to other areas and activating undesired fluorescent areas. The glass shield 33 may take on a considerable negative potential because of this collection of arrested high speed electrons. This negative potential will be reduced somewhat by secondary emision but those electrons which remain on the glass surface tend to create a negative electric field which repels the electrons and forces them to strike the desired areas of the anode surface.

Figure 7:
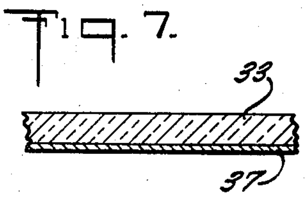
FIG. 7 is a cross sectional view of the glass plate shown in FIGS. 1 and 4 and indicates an alternate scheme of coating the glass plate with a thin conductive film.

The alternate glass plate 33 shown in FIG. 7 includes a conductive film 37 which may be connected to one of the conductive pins 21 and to a source of potential in an external circuit. This film absorbs the electrons which strike it and if this film is provided with a negative potential with respect to the anode, high speed electrons are returned to the anode areas where fluorescence is desired.

Figure 5:
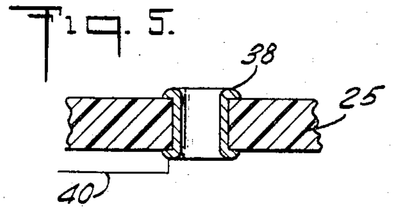
FIG. 5 is a partial cross sectional view of the insulator member showing an alternate method of positioning the control electrodes. The control electrode comprises a grommet secured to the insulator.
Figure 6:
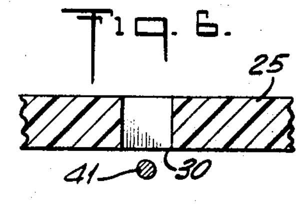
FIG. 6 is a cross sectional view similar to FIG. 5 but showing an alternate form of a control electrode, in this case, a single wire.

Control electrodes 24 are conventional and provide a good controlling action over the electron stream. FIG. 5 shows another form of the control electrode which comprises a grommet 38 secured to one of the apertures in the insulator 25. By providing the proper negative control voltage over conductor 40, grommet 38 produces an electric field which prohibits electrons from passing through the aperture. An applied voltage which is more positive than the cut-off potential permits electrons to pass through the grommet and strike the anode. FIG 6 shows an alternate method of controlling the electron stream where a single wire 41 is positioned adjacent to the aperture 30. This produces the same effect.

Figures 9, 10:
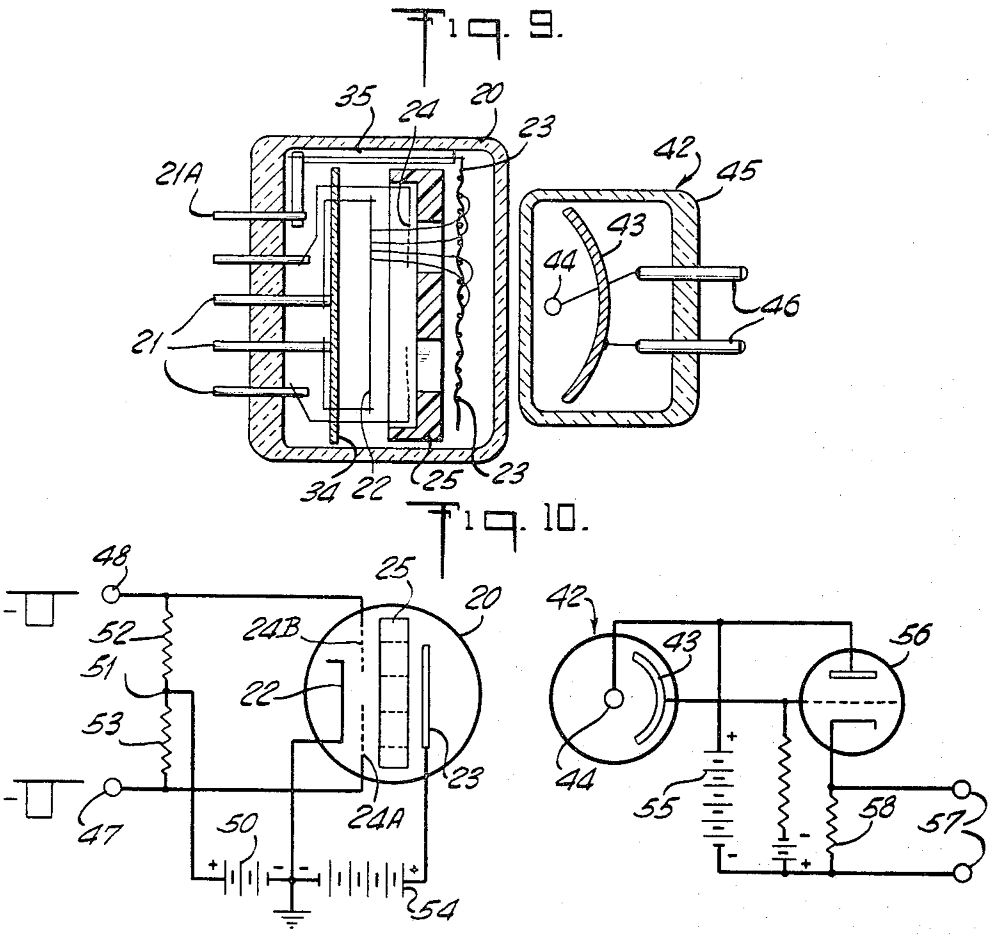
FIG. 9 is a cross sectional view showing the readout tube of FIG. 1 (without the glass plate) mounted adjacent to a photoelectric cell for the transmission of electrical pulses.
FIG. 10 is a schematic diagram of connections showing the readout tube and a photoelectric cell arranged for reception of light pulses from the readout tube. This combination is an "AND" component used in many computer circuits.

The above described readout device is for showing indicia on an anode. Experiments have shown that such tubes must be provided with a glass plate shield 33 as shown in the drawings. When this shield is eliminated as shown in FIGS. 9 and 10, electron flow produces illumination on most of the anode areas. The anode 23 shown in FIGS. 9 and 10 contains fluorescent material deposited over its entire surface so that any positively activated control electrode produces illumination over a wide area. It is planned to use the readout tube shown in FIG. 9 in conjunction with a photosensitive element such as a photoelectric cell 42 of conventional design having a cathode 43 and an anode 44, both positioned within a highly evacuated envelope 45. Both electrodes are connected to lead-in conductors 46.

One method of utilizing these two components is shown in FIG. 10 where one control electrode 24A of the new tube is connected directly to an input terminal 47. The other control electrode 24B of the new tube is connected to terminal 48. A positive biasing battery 50 is connected between a cathode 22 and the mid-point 51 of a voltage supply circuit containing resistors 52 and 53. The anode 23 is connected to the positive terminal of another source of potential 54.

The photoelectric cell 42 has its anode 44 connected to the positive terminal of a source of potential 55 and the anode of a triode amplifier vacuum tube 56. The cathode 43 of the photoelectric cell 42 is connected to a control electrode in the amplifier tube. In this scheme of connections, output terminals 57 are connected across a cathode resistor 58, thereby forming the usual cathode follower type of amplifier circuit. The operation of this circuit is as follows: under normal conditions, when there is no potential applied to input terminals 47 and 48, both control electrodes 24A and 24B are at a positive potential with respect to the cathode and both produce electron streams which light up the anode 23, thereby producing illumination which renders the photoelectric cell conductive and produces a voltage between output terminals 57.

When a negative potential is applied to either terminal 47 or 48, the amount of light produced by anode 23 is reduced somewhat but there is still enough light to maintain the photoelectric cell 42 in its conductive condition. However, when negative potentials are applied to both terminals 47 and 48, the light produced by anode 23 is cut off completely and the voltage of output terminals 57 is reduced a significant amount and the connected circuitry is activated accordingly.

Figure 11:
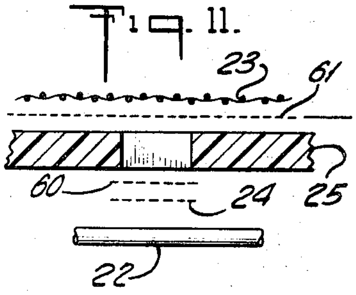
FIG. 11 is a cross sectional view similar to FIG. 4 but showing an accelerating control electrode and a shield arranged between a cathode and the anode.

FIG. 11 shows two additional control electrodes 60 and 61 added to the tube. Electrode 60 is the usual accelerating electrode found in tetrodes and pentodes and acts to give the electrons additional energy. Electrode 61 is the usual screen for absorbing secondary electrons produced by the anode. Circuit connections which supply these electrodes are well known in the art and need not be shown here in detail.

Figure 12:
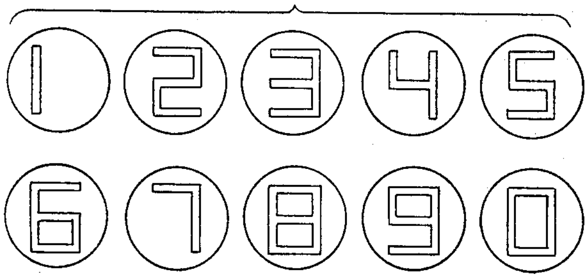
FIG. 12 is a series of ten views showing one set of formations of figures which may be produced by seven segments of insulator apertures and seven corresponding control electrodes.

The designs shown in FIG. 12 illustrate one set of figures which may be formed on the anode in a single plane by the use of only seven segments. Additional segments may be employed to form additional characters and letters.

The foregoing disclosure and drawings are merely illustrative of the principles of this invention and are not to be interpreted in a limiting sense. The only limitations are to be determined from the scope of the appended claims.

We claim:

1. A vacuum fluorescent readout device comprising; a sealed envelope including a cathode, an anode, and a plurality of control electrodes; a flat insulator positioned between the cathode and the anode, said insulator formed with a plurality of apertures for the passage of electrons from the cathode to the anode; and a fluorescent material deposited on the anode for generation of light when actuated by electrons; said control electrodes respectively positioned adjacent to said apertures for selectively controlling the passage of electrons therethrough.

2. A vacuum fluorescent readout device comprising; a sealed envelope including a cathode, an anode, and a plurality of control electrodes; a flat insulator positioned between the cathode and the anode, said insulator formed with a plurality of apertures for the passage of electrons from the cathode to the anode; said insulator apertures arranged in a desired pattern for the selective formation of indicia on the anode; and a fluorescent material deposited on the anode for the generation of a light pattern when activated by electrons; said control electrodes respectively positioned adjacent to said insulator apertures for selectively controlling the passage of electrons therethrough and for applying electrons to the adjacent anode area.

3. A readout device as claimed in claim 2 wherein the anode comprises a flat conductor having a plurality of spaced openings for the passage of electrons.

4. A readout device as claimed in claim 3 wherein said fluorescent material is deposited only on the solid portions of the anode thereby permitting electrons to pass through the anode openings.

5. A readout device as claimed in claim 3 wherein said fluorescent material is deposited in selected areas corresponding to the pattern formed by the insulator apertures.

6. A vacuum fluorescent readout device comprising; a sealed envelope including an electron emissive cathode, a perforate anode, and a plurality of control electrodes; a flat insulator positioned between the control electrodes and the anode, said insulator formed with a plurality of oblong apertures for the passage of electrons from the cathode to the anode; said insulator apertures arranged in a desired pattern for the selective formation of indicia on the anode; a fluorescent material deposited on the anode for the generation of a light pattern when activated by electrons; said control electrodes respectively positioned adjacent to the insulator apertures for controlling the passage of electrons therethrough and for applying electrons to the adjacent anode; and a transparent insulator barrier mounted adjacent to the anode and substantially parallel to it for restricting the passage of electrons to a desired anode area.

7. A readout device as claimed in claim 6 wherein said fluorescent material is deposited only on the solid portions of the anode thereby permitting electrons to pass through the anode openings.

8. A readout device as claimed in claim 6 wherein said fluorescent material is deposited in selected areas corresponding to the pattern formed by the insulator apertures.

9. A readout device as claimed in claim 6 wherein said control electrodes are each coextensive with their adjacent insulator apertures and wherein each control electrode is connected to a lead-in conductor for connection to an external circuit.

10. A readout device as claimed in claim 6 wherein said insulator barrier is a thin glass disk.

11. A readout device as claimed in claim 6 wherein said insulator barrier is coated with a transparent conductive film on its surface adjacent to the anode for absorbing electrons and for creating an electric field between the anode and the film.

12. A readout device as claimed in claim 11 wherein said conductive film on the barrier is connected to a lead-in conductor for connection to an external circuit.

13. An "AND" circuit component for the transmission of signals from a plurality of input circuits to an output circuit comprising; a first transducer for converting electric energy into light energy; a second transducer for converting light energy into electric energy; said first transducer including an evacuated envelope containing an anode, a cathode and a plurality of control electrodes; said anode comprising a flat conductor having a plurality of spaced openings for the passage of electrons; a fluorescent material deposited on the anode for generation of light when activated by electrons; a flat insulator positioned between the cathode and the anode formed with a plurality of apertures for the passage of electrons from the cathode to the anode; said control electrodes respectively positioned adjacent to said apertures for selectively controlling the passage of electrons therethrough; said input terminals connected to said control electrodes for the application of control voltage pulses; and connections between said second transducer and the output terminals.

14. An "AND" circuit as claimed in claim 13 wherein said second transducer is a photoelectric cell comprising an envelope, an anode, and a cathode; said anode and cathode respectively coupled to the output terminals in series with a source of electric power.

15. An "AND" circuit component as claimed in claim 13 wherein said fluorescent material is deposited only on the solid portions of the anode thereby permitting electrons to pass through the anode openings.

16. An "AND" circuit component as claimed in claim 13 wherein said control electrodes are each coextensive with an adjacent insulator aperture for controlling the electron flow through the aperture.

17. An "AND" circuit component as claimed in claim 13 wherein said first and second transducers are mounted in close proximity, with the anode of the first transducer substantially parallel to the cathode of the second transducer.

18. An "AND" circuit component as claimed in claim 17 wherein said control electrodes are normally biased for permitting electron conduction between the cathode and the anode of the first transducer and wherein the control electrodes are activated by an applied negative pulse to cut off said electron conduction.

No references cited.

RALPH G. NILSON, *Primary Examiner.*

T. N. GRIGSBY, *Assistant Examiner.*